(12) United States Patent
Cao et al.

(10) Patent No.: US 12,441,568 B2
(45) Date of Patent: Oct. 14, 2025

(54) COIL REPLACING DEVICE (71) Applicant: WUXI LEAD INTELLIGENT EQUIPMENT CO., LTD., Jiangsu (CN)

(72) Inventors: Er Cao, Wuxi (CN); Xiaofei Yang, Wuxi (CN)

(73) Assignee: WUXI LEAD INTELLIGENT EQUIPMENT CO., LTD., Wuxi (CN)

( * ) Notice: Subject to any disclaimer, the term of this patent is extended or adjusted under 35 U.S.C. 154(b) by 352 days.

(21) Appl. No.: 18/157,295

(22) Filed: Jan. 20, 2023

(65) Prior Publication Data

US 2024/0076157 A1 Mar. 7, 2024

Related U.S. Application Data

(63) Continuation of application No. PCT/CN2022/129212, filed on Nov. 2, 2022.

(30) Foreign Application Priority Data

Sep. 2, 2022 (CN) .......................... 202222341734.9

(51) Int. Cl.
  *B65H 19/18* (2006.01)
  *B65H 19/10* (2006.01)
  (Continued)

(52) U.S. Cl.
  CPC ....... *B65H 19/1852* (2013.01); *B65H 19/102* (2013.01); *B65H 19/20* (2013.01);
  (Continued)

(58) Field of Classification Search
  CPC ............. Y10T 83/7487; Y10T 83/0495; Y10T 83/664; Y10T 83/6654; Y10T 83/7684;
  (Continued)

(56) References Cited

U.S. PATENT DOCUMENTS 4,322,043 A * 3/1982 Grollimund ........... B65H 19/10
                                                            352/123
4,643,783 A    2/1987 Hogenson
                     (Continued)

FOREIGN PATENT DOCUMENTS

CN        112456199 A     3/2021
CN        214114355 U     9/2021
                (Continued)

OTHER PUBLICATIONS

International Search Report issued on Apr. 26, 2023, in corresponding International Application No. PCT/CN2022/129212, 7 pages.
Extended Search Report issued on Apr. 8, 2024, in corresponding European Application No. 22839110.8, 6 pages.

*Primary Examiner* — Phong H Nguyen
(74) *Attorney, Agent, or Firm* — Maier & Maier, PLLC (57) ABSTRACT

A coil replacing device. When a first unreeling assembly at an unreeling station finishes unreeling, a fixing suction member can be driven by a first driver abutting against a first suction member clamping a working material tape, a first cutting assembly cuts off the working material tape, and the cut working material tape is sucked by the fixing suction member. Then, a vertical plate slides to make a second unreeling assembly enter the unreeling station, a material tape sucked by a second suction member will also enter the unreeling station as a spare material tape, and the first unreeling assembly will be removed from the unreeling station. The fixing suction member is driven by the first driver to abut against the second suction member, so as to realize coil replacing, and the first unreeling assembly can be loaded with a new material tape to serve as a spare material tape.

18 Claims, 7 Drawing Sheets

(51) Int. Cl.
*B65H 19/20* (2006.01)
*H01M 10/04* (2006.01)

(52) U.S. Cl.
CPC .. *B65H 2301/4606* (2013.01); *B65H 2401/20* (2013.01); *B65H 2406/34* (2013.01); *B65H 2408/22* (2013.01); *B65H 2553/412* (2013.01); *H01M 10/0409* (2013.01)

(58) Field of Classification Search
CPC . Y10T 83/8821; Y10T 83/889; Y10T 83/896; Y10T 83/902; B65H 19/1852; B65H 19/102; B65H 19/20; B65H 2301/4606; B65H 2406/34; B65H 2401/20; B65H 2408/22; B65H 2553/412; H01M 10/0409
See application file for complete search history.

(56) References Cited

U.S. PATENT DOCUMENTS

| | | | |
|---|---|---|---|
| 2011/0280701 A1* | 11/2011 | Brighenti | B65H 57/26 |
| | | | 242/615.3 |
| 2021/0126277 A1* | 4/2021 | Park | H01M 10/0404 |

FOREIGN PATENT DOCUMENTS

| | | |
|---|---|---|
| CN | 113716373 A | 11/2021 |
| CN | 214733119 U | 11/2021 |
| CN | 216583209 U | 5/2022 |
| CN | 114620515 A | 6/2022 |
| CN | 216996911 U | 7/2022 |
| JP | 2004203538 A | 7/2004 |
| WO | 2024045317 A1 | 3/2024 |

* cited by examiner

COIL REPLACING DEVICE

TECHNICAL FIELD

The application relates to the technical field of lithium battery equipment, in particular to a coil replacing device.

BACKGROUND

During lithium battery production by a winding process, an anode plate, a separator and a cathode plate need to be wound to form a battery cell. In the winding process, adhesive tape needs to be attached to an electrode plate or a tab, and the adhesive tape is usually provided in an unreeling manner. When one tape coil is used up, another tape coil needs to be supplied in time. However, an existing tape coil replacing device has a complex structure and occupies a large space, which is not conducive to the miniaturization of equipment.

SUMMARY

In view of the above, it is necessary to provide a coil replacing device which has a simple structure and occupies a small space to solve the above problems.

A coil replacing device comprises:

an unreeling mechanism, comprising a vertical plate, and a first unreeling assembly and a second unreeling assembly arranged on the vertical plate in a spaced manner in a first direction, the first unreeling assembly comprising a first suction member, the second unreeling assembly comprising a second suction member, and the first suction member and the second suction member being capable of sucking material tapes unreeled by the first unreeling assembly and the second unreeling assembly respectively; and a tape connecting mechanism, comprising a mounting plate, and a first cutting assembly and a fixing assembly arranged on the mounting plate, the vertical plate being slidably arranged at an end of the mounting plate in the first direction to make the first unreeling assembly and the second unreeling assembly alternately enter an unreeling station, and the material tape unreeled by the first unreeling assembly or the second unreeling assembly at the unreeling station being used as a working material tape and sequentially passing through the first cutting assembly and the fixing assembly;

wherein the fixing assembly comprises a fixing suction member and a first driver, the fixing suction member is arranged opposite to the first suction member or the second suction member located at the unreeling station in a second direction perpendicular to the first direction, the first driver is capable of driving the fixing suction member to move in the second direction to make the fixing suction member abut against or leave the first suction member or the second suction member located at the unreeling station, and the first cutting assembly is capable of cutting the working material tape clamped between the fixing suction member and the first suction member or the second suction member.

In one embodiment, a first material preparation station and a second material preparation station are provided on both sides of the unreeling station in the first direction respectively, and the vertical plate passes through a first position and a second position when sliding in the first direction; when the vertical plate passes through the first position, the first unreeling assembly enters the unreeling station and the second unreeling assembly enters the second material preparation station; and when the vertical plate passes through the second position, the second unreeling assembly enters the unreeling station, and the first unreeling assembly enters the first material preparation station.

In one embodiment, the tape connecting mechanism further comprises a second cutting assembly and a third cutting assembly arranged on the mounting plate, the second cutting assembly and the third cutting assembly are located at the first material preparation station and the second material preparation station respectively, the second cutting assembly is for cutting off a starting end of the material tape sucked by the first suction member, and the third cutting assembly is for cutting off a starting end of the material tape sucked by the second suction member.

In one embodiment, the tape connecting mechanism further comprises a second tape pressing assembly and a third tape pressing assembly arranged on the mounting plate, the second tape pressing assembly and the third tape pressing assembly are located at the first material preparation station and the second material preparation station respectively, the second tape pressing assembly is capable of pressing the material tape unreeled by the first unreeling assembly against the first suction member in the second direction, the third tape pressing assembly is capable of pressing the material tape unreeled by the second unreeling assembly against the second suction member in the second direction, and the second cutting assembly and the third cutting assembly are capable of cutting off the material tapes pressed by the second tape pressing assembly and the third tape pressing assembly respectively.

In one embodiment, the second cutting assembly comprises a second driver, a second cutter holder and a second cutter, the second cutter is installed on the second cutter holder, and the second driver is capable of driving the second cutter holder to move in the second direction; the second tape pressing assembly comprises a second pressing member and a second elastic member, the second pressing member is slidably installed on the second cutter holder in the second direction, and the second elastic member is arranged between the second pressing member and the second cutter holder; and when the second driver drives the second cutter holder to approach the first suction member in the second direction, the second pressing member abuts against the material tape sucked by the first suction member before the second cutter, and with the second elastic member being compressed and deformed, the second cutter stretches out relative to the second pressing member until the material tape is cut off.

In one embodiment, the second pressing member comprises a pressing rod and a pressing head, the pressing rod extends in the second direction and slidably penetrates through the second cutter holder, the pressing head is fixedly arranged at an end, away from the second cutter holder, of the pressing rod, the second elastic member is a compression spring, the compression spring is disposed around the pressing rod, and two ends of the compression spring abut against the pressing head and the second cutter holder respectively.

In one embodiment, a groove is formed in a side, facing the first suction member, of the second pressing member, and an edge of the groove is covered with an anti-sticking layer.

In one embodiment, the vertical plate is L-shaped, an end of the vertical plate is slidably connected to the mounting plate, and another end of the vertical plate extends above the mounting plate to make the unreeling mechanism and the tape connecting mechanism overlap in part in a vertical direction.

In one embodiment, an end of the mounting plate is provided with a guide rail extending in the first direction, a side, facing the mounting plate, of the vertical plate is provided with a slider, and the guide rail cooperates with the slider to make the vertical plate and the mounting plate slidably connected with each other.

In one embodiment, the coil replacing device further comprises a driving mechanism, and a driving end of the driving mechanism is connected to the vertical plate in a driving mode to drive the vertical plate to slide along the guide rail.

In one embodiment, the first suction member and the second suction member are suction discs or suction plates.

In one embodiment, the first unreeling assembly further comprises a first unreeling detector being capable of generating a trigger command after detecting that the unreeling of the working material tape of the first unreeling assembly is completed.

In one embodiment, the first unreeling detector comprises a detection roller and a photoelectric sensor, the working material tape unreeled by the first unreeling assembly passes around and supports the detection roller, the detection roller falls under influence of gravity when the detection roller loses the support of the working material tape, and the photoelectric sensor is for monitoring the movement state of the detection roller.

In one embodiment, the second unreeling assembly further comprises a second unreeling detector being capable of generating a trigger command after detecting that the unreeling of the working material tape of the second unreeling assembly is completed.

In one embodiment, the first unreeling assembly comprises a first pressing seat arranged on the vertical plate and located upstream of the first suction member, and the first cutting assembly cooperates with the first pressing seat to cut off the working material tape unreeled by the first unreeling assembly; and the second unreeling assembly comprises a second pressing seat arranged on the vertical plate and located upstream of the second suction member, and the first cutting assembly cooperates with the second pressing seat to cut off the working material tape unreeled by the second unreeling assembly.

In one embodiment, the tape connecting mechanism further comprises a clamping assembly located upstream of the first cutting assembly, the working material tape unreeled by the unreeling mechanism passes through the clamping assembly before passing through the first cutting assembly and the fixing assembly, and the clamping assembly is capable of clamping the working material tape passing by.

In one embodiment, the first unreeling assembly further comprises a first passing roller arranged on the vertical plate and located upstream of the first suction member, and the material tape unreeled by the first unreeling assembly passes around the first passing roller; the clamping assembly comprises an idler and a third driver; when the first unreeling assembly is located at the unreeling station, the idler and the first passing roller are oppositely arranged in the second direction, and the third driver is capable of driving the idler to move in the second direction until the idler abuts against the first passing roller to clamp the working material tape; the second unreeling assembly further comprises a second passing roller arranged on the vertical plate and located upstream of the second suction member, and the material tape unreeled by the second unreeling assembly passes around the second passing roller; and when the second unreeling assembly is located at the unreeling station, the idler and the second passing roller are oppositely arranged in the second direction, and the third driver is capable of driving the idler to move in the second direction until the idler abuts against the second passing roller to clamp the working material tape.

In one embodiment, the fixing suction member is a suction disc or a suction plate.

In one embodiment, the fixing assembly further comprises flattening rollers located upstream and downstream of the fixing suction member, and the flattening rollers are capable of moving in the second direction, and holding the material tape together with the fixing suction member against the first suction member or the second suction member located at the unreeling station.

In one embodiment, the fixing assembly comprises a roller seat and a fourth driver, the flattening rollers are installed on the roller seat installed at a moving end of the fourth driver, and the fourth driver is capable of driving the roller seat to move in the second direction to make the flattening rollers abut against or leave the first suction member or the second suction member at the unreeling station; and a middle of the roller seat is provided with a through hole, and the fixing suction member is capable of passing through the through hole under the driving of the first driver.

According to the coil replacing device, when the first unreeling assembly at the unreeling station finishes unreeling, the fixing suction member can be driven by the first driver to abut against the first suction member to clamp the working material tape, the first cutting assembly cuts off the working material tape, and the cut working material tape is sucked by the fixing suction member. Then, the vertical plate slides in the first direction until the second unreeling assembly enters the unreeling station, the material tape sucked by the second suction member will also enter the unreeling station as a spare material tape, and the first unreeling assembly will be removed from the unreeling station. The fixing suction member is driven by the first driver to abut against the second suction member, so that a cut end of the working material tape can be attached to and bonded with a starting end of the spare material tape, so as to realize coil replacing, and the first unreeling assembly can be loaded with a new material tape to serve as a spare material tape. In the coil replacing process, the vertical plate can slide back and forth in the first direction, and the moving process and transmission structure are simple. The coil replacing device has a simple structure and occupies a small space.

BRIEF DESCRIPTION OF THE DRAWINGS

In order to more clearly explain the embodiments of the application or the technical scheme in the prior art, the following will briefly introduce the drawings needed in the description of the embodiments or the prior art. Obviously, the drawings in the following description only illustrate some embodiments of the application. For those of ordinary skill in the art, other drawings can be obtained according to the following ones without creative labor.

DETAILED DESCRIPTION OF THE EMBODIMENTS

In order to make the above objects, features and advantages of this application more obvious and understandable, the following detailed description of this application will be made with reference to the accompanying drawings. In the following description, numerous specific details are set forth in order to provide a thorough understanding of the application. However, this application can be implemented in many other ways different from those described here, and those skilled in the art can make similar improvements without violating the connotation of this application. Therefore, this application is not limited by the specific embodiments disclosed below.

In the description of the application, it should be understood that directional or positional relationships indicated by the terms such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial" and "circumferential" are based on the directional or positional relationships shown in the drawings, which are only for the convenience of describing the application and simplifying the description, but do not indicate or imply that the referred devices or elements must have a specific orientation or be constructed and operated in a specific orientation, so they cannot be understood as limiting the application.

In addition, the terms "first" and "second" are only used for descriptive purposes, and cannot be understood as indicating or implying relative importance or implicitly indicating the number of indicated technical features. Therefore, the features defined with "first" and "second" may include one or more of the features explicitly or implicitly. In the description of this application, "multiple" means at least two, such as two, three, etc., unless otherwise specifically defined.

In the application, unless otherwise specified and defined, the terms "install", "connect", "attach" and "fix" should be understood in a broad sense. For example, it can be fixed connection, detachable connection or integrated connection; it can be mechanical connection or electric connection; and it can be direct connection, indirect connection through intermediate media or internal communication or interaction of two elements, unless otherwise explicitly defined. Those of ordinary skill in the art can understand the specific meaning of the above terms in the application in specific situations.

In this application, unless otherwise specified and limited, the expression that a first feature is "above" or "below" a second feature may mean that the first feature and the second feature are in direct contact, or the first feature and the second feature are in indirect contact through an intermediary. Furthermore, the expression that the first feature is "above" the second feature may be that the first feature is directly above or obliquely above the second feature, or it only means that a level of the first feature is higher than that of the second feature; and the expression that the first feature is "below" the second feature may be that the first feature is directly below or obliquely below the second feature, or it only means that the level of the first feature is lower than that of the second feature.

It should be noted that when an element is described as being "fixed to" or "arranged on" another element, it may be directly on another element or there may be an intermediate element. When an element is considered to be "connected" to another element, it may be directly connected to another element or there may be an intermediate element. The terms "vertical", "horizontal", "upper", "lower", "left", "right" and similar expressions used herein are for the purpose of illustration only, and are not meant to be the only implementation way.

Figure 1:
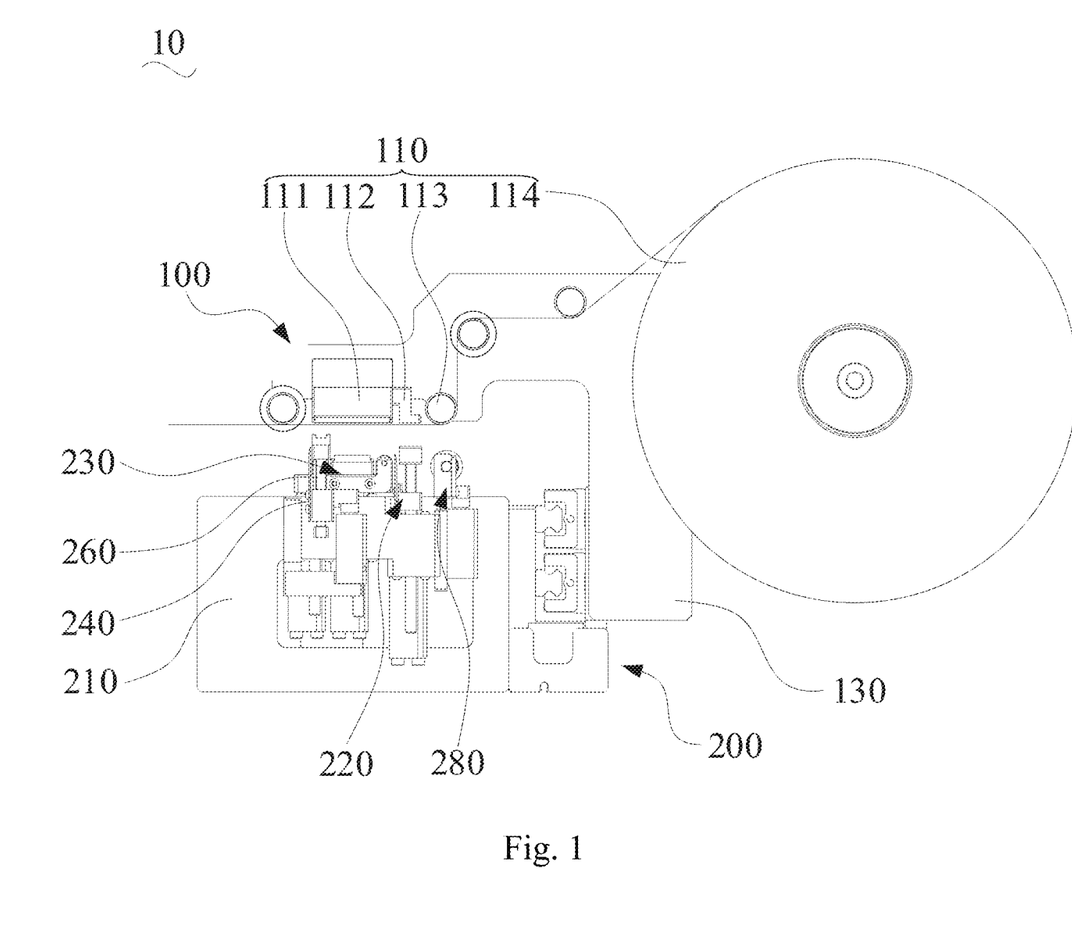
FIG. 1 is a front view of a coil replacing device in a preferred embodiment of the application.

Referring to FIG. 1, a coil replacing device 10 in a preferred embodiment of the application comprises an unreeling mechanism 100 and a tape connecting mechanism 200.

The unreeling mechanism 100 can output two material tapes through unreeling. Each material tape comprises a plain surface and a sticky surface, the plain surface refers to the non-sticky side and the sticky surface refers to the sticky side. In this embodiment, the material tape refers to adhesive tape. The two material tapes can be alternately used as a working material tape and a spare material tape. The working material tape refers to the material tape which is unreeled and output by the unreeling mechanism 100 and then transported downstream, and enters the next process after passing through the tape connecting mechanism 200. The spare material tape is not transported to the downstream process via the tape connecting mechanism 200 for the time being, but only serves as a supplement after the unreeling of the working material tape. When the unreeling of the working material tape is finished, the spare material tape can be connected to the working material tape at the tape connecting mechanism 200, so that coil replacing is realized.

Figure 2:
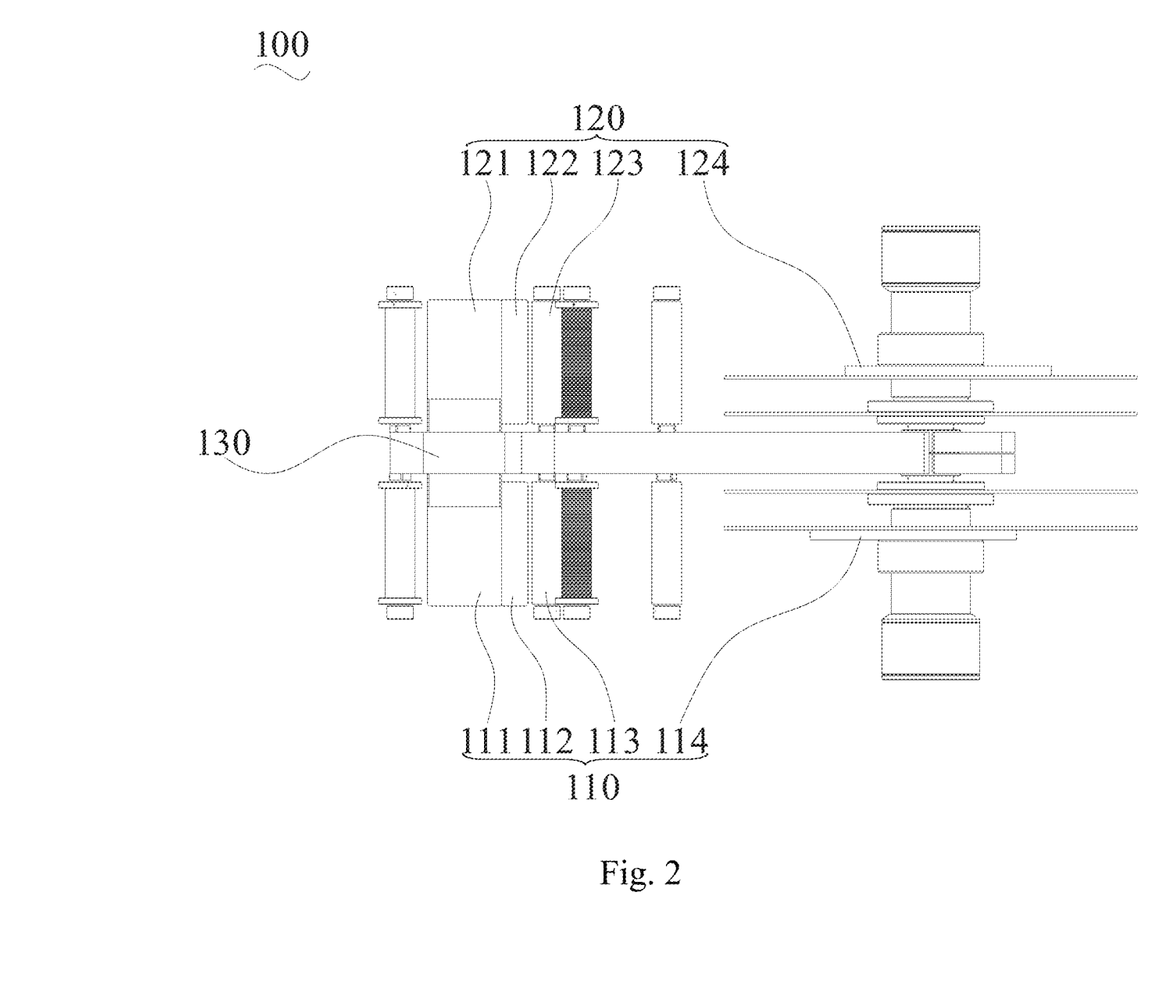
FIG. 2 is a top view of an unreeling mechanism in the coil replacing device shown in FIG. 1.

Referring to FIG. 2, the unreeling mechanism 100 comprises a first unreeling assembly 110, a second unreeling assembly 120 and a vertical plate 130. The first unreeling assembly 110 and the second unreeling assembly 120 are arranged on the vertical plate 130 in a spaced manner in a first direction.

The first direction refers to the direction perpendicular to the drawing plane shown in FIG. 1, that is, the up-down direction shown in FIG. 2. The first unreeling assembly 110 and the second unreeling assembly 120 can both unreel material tapes, so the two material tapes output by the unreeling mechanism 100 will also be arranged in a spaced manner in the first direction. Correspondingly, the materials tapes unreeled by the first unreeling assembly 110 and the second unreeling assembly 120 can be alternately used as a working material tape and a spare material tape. That is, when the material tape unreeled by the first unreeling assembly 110 is used as a working material tape, the material tape unreeled by the second unreeling assembly 120 will be used as a spare material tape 22, and vice versa.

The first unreeling assembly 110 comprises a first suction member 111, the second unreeling assembly 120 comprises a second suction member 121, and the first suction member 111 and the second suction member 121 can suck the material tapes unreeled by the first unreeling assembly 110 and the second unreeling assembly 120, respectively. Specifically, the first suction member 111 and the second suction member 121 generally have a same structure, and can be suction discs, suction plates, etc., which can suck the material tapes by vacuum adsorption or electrostatic adsorption. In actual use, adsorption surfaces of the first suction member 111 and the second suction member 121 face downward, and can adsorb the plain surface of the material tape, that is, the non-sticky side of the material tape.

Generally, the first unreeling assembly 110 and the second unreeling assembly 120 have a same structure. The first unreeling assembly 110 further comprises a first unreeling shaft 114, and the second unreeling assembly 120 further comprises a second unreeling shaft 124. The first unreeling shaft 114 and the second unreeling shaft 124 are used for installing coils and outputting the material tapes downstream through unreeling, and the first unreeling shaft 114 and the second unreeling shaft 124 can be rotatably mounted on two sides of the vertical plate 130 by a same mounting shaft (not shown). In addition, the first unreeling assembly 110 and the second unreeling assembly 120 generally each comprise other elements such as a passing roller, and the other elements can also be mounted on two sides of the vertical plate 130 in the same way. Therefore, the first unreeling assembly 110 and the second unreeling assembly 120 are mirror images of each other.

Figure 3:
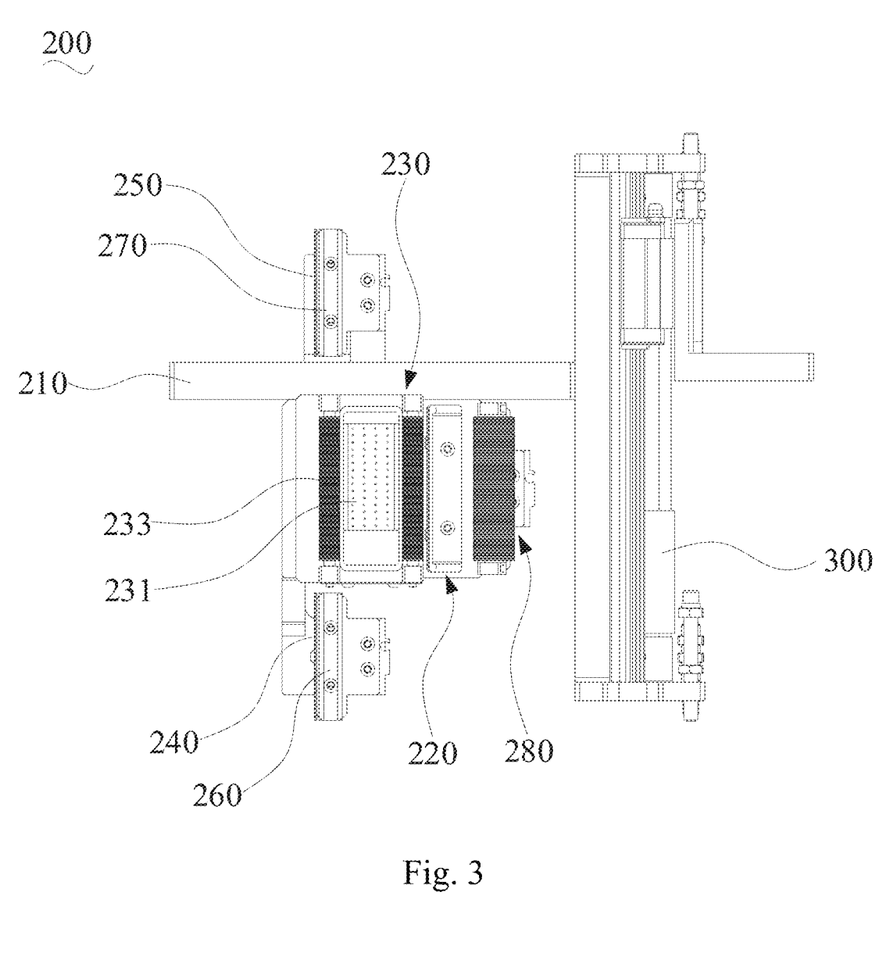
FIG. 3 is a top view of a tape connecting mechanism in the coil replacing device shown in FIG. 1.

Referring to FIG. 3, the tape connecting mechanism 200 comprises a mounting plate 210, a first cutting assembly 220 and a fixing assembly 230. The first cutting assembly 220 and the fixing assembly 230 are arranged on the mounting plate 210, and the first cutting assembly 220 is located upstream of the fixing assembly 230. The work material tape unreeled and output by the unreeling mechanism 100 can sequentially pass through the first cutting assembly 220 and the fixing assembly 230.

The vertical plate 130 is slidably arranged at an end of the mounting plate 210 in the first direction, to make the first unreeling assembly 110 and the second unreeling assembly 120 alternately enter the unreeling station, and the material tape unreeled by the first unreeling assembly 110 or the second unreeling assembly 120 at the unreeling station can be used as the working material tape. Specifically, the vertical plate 130 is generally L-shaped, with an end slidably connected to the mounting plate 210 and another end extending above the mounting plate 210. Therefore, the unreeling mechanism 100 and the tape connecting mechanism 200 can overlap in part in the vertical direction, thus making the structure of the coil replacing device 10 more compact. Specifically, an end of the mounting plate 210 is provided with a guide rail (not shown) extending in the first direction, a side, facing the mounting plate 210, of the vertical plate 130 is provided with a slider (not shown), and the guide rail cooperates with the slider to slidably connect the vertical plate 130 with the mounting plate 210.

In addition, the coil replacing device 10 also comprises a driving mechanism 300 which may be an electric cylinder, an air cylinder or a motor (motor is generally used in conjunction with a matching screw pair), and a driving end of the driving mechanism 300 is in driving connection with the vertical plate 130, so as to drive the vertical plate 130 to slide in the first direction.

Figure 4:
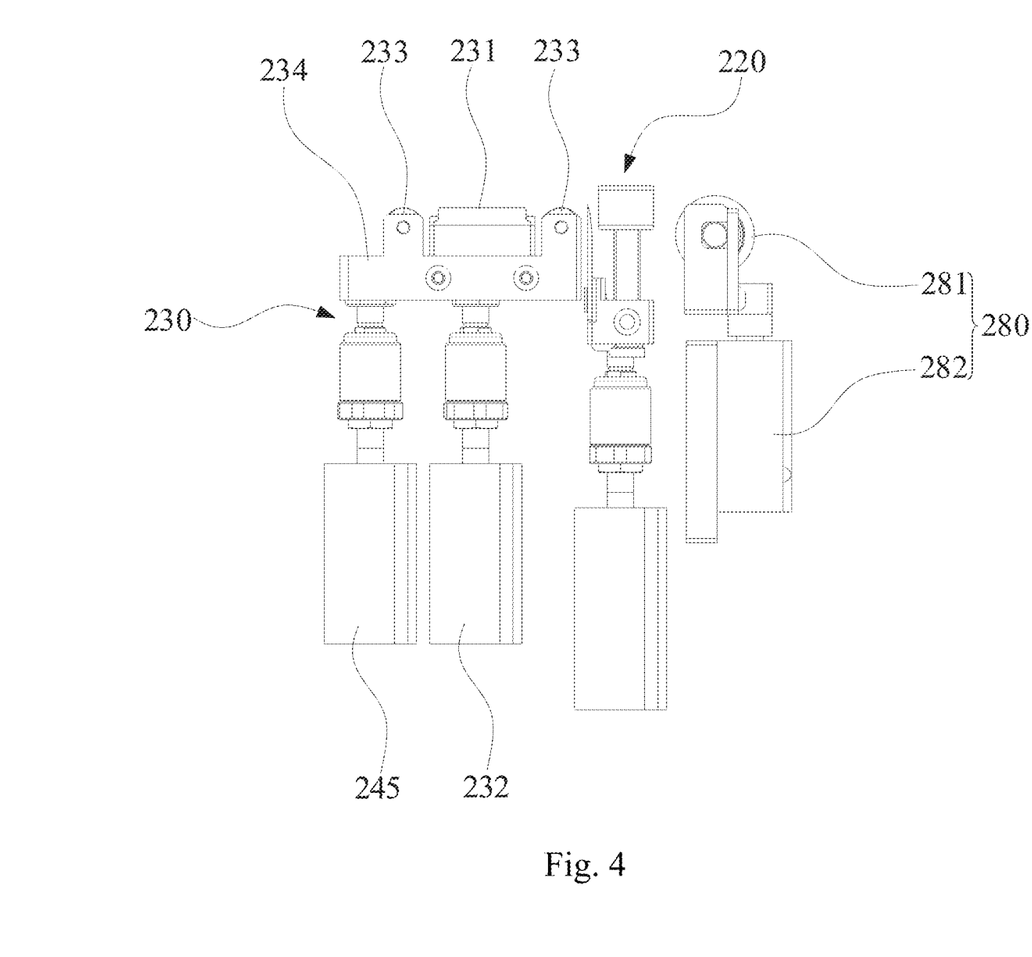
FIG. 4 is a front view of a partial structure of the tape connecting mechanism shown in FIG. 3, comprising a fixing assembly, a first cutting assembly and a clamping assembly.

Referring to FIG. 4, the fixing assembly 230 comprises a fixing suction member 231 and a first driver 232. A driving end of the first driver 232 is in driving connection with the fixing suction member 231, and the first driver 232 can drive the fixing suction member 231 to move in a second direction perpendicular to the first direction. The fixing suction member 231 may have the same structure as the first suction member 111 and the second suction member 121, and can also suck the material tape by vacuum adsorption or electrostatic adsorption.

The second direction refers to the up-down direction shown in FIGS. 1 and 4, or the direction perpendicular to the drawing plane shown in FIG. 3. When the first unreeling assembly 110 enters the unreeling station, the fixing suction member 231 and the first suction member 111 are arranged opposite to each other in the second direction. In this case, the first driver 232 can drive the fixing suction member 231 to move in the second direction to make the fixing suction member 231 abut against or leave the first suction member 111. When the second unreeling assembly 120 enters the unreeling station, the fixing suction member 231 and the second suction member 121 are arranged opposite to each other in the second direction. In this case, the first driver 232 can drive the fixing suction member 231 to move in the second direction to make the fixing suction member 231 abut against or leave the second suction member 121.

When the fixing suction member 231 abuts against the first suction member 111 or the second suction member 121, the working material tape passing through the first cutting assembly 220 and the fixing assembly 230 can be clamped. Further, the first cutting assembly 220 can cut the working material tape clamped between the fixing suction member 231 and the first suction member 111 or the second suction member 121. Specifically, the first cutting assembly 220 generally cuts the working material tape through cutter stretching out and drawing back. After the working material tape is cut off, a cut end will be obtained, which will be sucked and fixed by the fixing suction member 231.

Assuming that in the initial state, the material tape unreeled by the first unreeling assembly 110 is the working material tape, and the material tape unreeled by the second unreeling assembly 120 is the spare material tape, in this case, the first unreeling assembly 110 is located at the unreeling station, and the first suction member 111 and the fixing suction member 231 are opposite to each other in the second direction. The working material tape unreeled by the first unreeling assembly 110 passes through the first cutting assembly 220 and the fixing assembly 230 in turn, while the spare material tape unreeled by the second unreeling assembly 120 (specifically, the starting end) is sucked and fixed to the second suction member 121.

When the first unreeling assembly 110 finishes unreeling, the fixing suction member 231 is driven by the first driver 232 to move up in the second direction to abut against the first suction member 111 to clamp the working material tape, and then the first cutting assembly 220 cuts the clamped working material tape to obtain the cut end of the working material tape. Then, the fixing suction member 231 is driven by the first driver 232 to move down in the second direction to leave the first suction member 111, and the cut working material tape is sucked and fixed by the fixing suction member 231. The vertical plate 130 slides in the first direction until the second unreeling assembly 120 enters the unreeling station. At this point, the second suction member 121 and the fixing suction member 231 are arranged opposite to each other in the second direction, and the material tape sucked by the second suction member 121 will also enter the unreeling station as the spare material tape. Then, the fixing suction member 231 is driven by the first driver 232 to move up again to abut against the second suction member 121, so that the cut end of the working material tape and the starting end of the spare material tape can be attached and bonded under the pressing of the second suction member 121 and the fixing suction member 231, so as to realize coil replacing. At this point, the material tape unreeled by the second unreeling assembly 120 is used as the working material tape, and the first unreeling assembly 110 has been removed from the unreeling station, so an old coil on the first unreeling assembly 110 can be removed and a new coil can be loaded as the spare material tape. The starting end of the loaded spare material tape can be manually pulled to the first suction member 111 to be sucked and fixed by the first suction member 111, so as to be prepared for the next coil replacing.

In this embodiment, the first unreeling assembly 110 further comprises a first unreeling detector (not shown), which can detect whether the unreeling of the working material tape output by the first unreeling assembly 110 is finished. The first unreeling detector generates a trigger command after detecting that the unreeling of the material tape is finished, so as to help the coil replacing device 10 start the coil replacing operation in time.

Specifically, a tail tag can be attached to the end of the material tape in advance, and when the tail tag is detected by the first unreeling detector, it means that unreeling is finished. In addition, the first unreeling detector may also comprise a detection roller and a photoelectric sensor. The working material tape output by the first unreeling assembly 110 passes around and support the detection roller. When unreeling is finished, the working material tape loses tension and cannot support the detection roller anymore, so the detection roller falls under influence of gravity and can be detected by the photoelectric sensor.

Similarly, when the material tape unreeled by the second unreeling assembly 120 is unreeled as the working material tape, the fixing suction member 231 is driven by the first driver 232 to move up in the second direction to abut against the second suction member 121 to clamp the working material tape, and then the first cutting assembly 220 cuts the clamped working material tape to obtain the cut end of the working material tape. Then, the fixing suction member 231 is driven by the first driver 232 to move down in the second direction to leave the first suction member 121, and the cut working material tape is sucked and fixed by the fixing suction member 231. The vertical plate 130 slides in the first direction until the first unreeling assembly 110 enters the unreeling station again. Then, the fixing suction member 231 is driven by the first driver 232 to move up again to abut against the first suction member 111, so that the cut end of the working material tape and the starting end of the spare material tape can be attached and bonded under the pressing of the first suction member 111 and the fixing suction member 231, so as to realize coil replacing. At this point, the material tape unreeled by the first unreeling assembly 110 is used as the working material tape, and the second unreeling assembly 120 has been removed from the unreeling station, so an old coil on the second unreeling assembly 120 can be removed and a new coil can be loaded as the spare material tape.

In this embodiment, the second unreeling assembly 120 also comprises a second unreeling detector, which can detect whether the unreeling of the working material tape output by the second unreeling assembly 120 is finished.

In this way, the first unreeling assembly 110 and the second unreeling assembly 120 will alternately unreel the working material tapes, and automatic coil replacing can be realized after the unreeling of the working material tape 21 is finished. In the coil replacing process, the vertical plate 130 can slide back and forth in the first direction, and the moving process and transmission structure are simple.

In this embodiment, the unreeling station is provided with a first material preparation station and a second material preparation station on both sides in the first direction respectively, and the vertical plate 130 passes through a first position and a second position when sliding in the first direction; when the vertical plate 130 passes through the first position, the first unreeling assembly 110 enters the unreeling station and the second unreeling assembly 120 enters the second material preparation station; and when the vertical plate 130 passes through the second position, the second unreeling assembly 120 enters the unreeling station, and the first unreeling assembly 110 enters the first material preparation station.

At the second material preparation station, the coil can be unreeled by the second unreeling assembly 120 completely, and a new coil can be loaded on the second unreeling assembly 120. At the first material preparation station, the coil can be unreeled by the first unreeling assembly 110 completely, and a new coil can be loaded on the first unreeling assembly 110. It can be seen that the unreeling of the working material tape and the preparation of the spare material tape can be performed at the same time, thus improving operation efficiency.

Referring to FIG. 3 again, in this embodiment, the tape connecting mechanism 200 further comprises a second cutting assembly 240 and a third cutting assembly 250 arranged on the mounting plate 210, the second cutting assembly 240 and the third cutting assembly 250 are respectively located at the first material preparation station and the second material preparation station, the second cutting assembly 240 is used for cutting off a starting end of the material tape sucked by the first suction member 111, and the third cutting assembly 250 is used for cutting off a starting end of the material tape sucked by the second suction member 121.

Specifically, when the vertical plate 130 passes through the first position, the second unreeling assembly 120 enters the second material preparation station, and the third cutting assembly 250 can cut off the starting end of the material tape sucked by the second suction member 121. When the vertical plate 130 passes through the second position, the first unreeling assembly 110 enters the first material preparation station, and the second cutting assembly 240 can cut off the starting end of the material tape sucked by the first suction member 111.

It can be seen that before coil replacing, the spare material tape unreeled by the first unreeling assembly 110 or the second unreeling assembly 120 will be cut off, thus forming a new starting end of the spare material tape. In this way, the length of the spare material tape stretching out of the first suction member 111 or the second suction member 121 can be accurately controlled, so as to ensure the consistency of positions of the starting ends of the spare material tapes every time a coil is replaced, and the alignment with the working material tape sucked and fixed by the fixing suction member 231 in the second direction, and then smooth attachment and bonding are realized.

Further, in this embodiment, the tape connecting mechanism 200 further comprises a second tape pressing assembly 260 and a third tape pressing assembly 270 arranged on the mounting plate 210, the second tape pressing assembly 260 and the third tape pressing assembly 270 are respectively located at the first material preparation station and the second material preparation station, the second tape pressing assembly 260 is able to press the material tape unreeled by the first unreeling assembly 110 against the first suction member 111 in the second direction, the third tape pressing assembly 270 is able to press the material tape unreeled by the second unreeling assembly 120 against the second suction member 121 in the second direction, and the second cutting assembly 240 and the third cutting assembly 250 are able to respectively cut the material tapes pressed by the second tape pressing assembly 260 and the third tape pressing assembly 270.

The second tape pressing assembly 260 and the third tape pressing assembly 270 are located upstream of the second cutting assembly 240 and the third cutting assembly 250 respectively, that is, on the right side as shown in FIG. 3. When the vertical plate 130 passes through the second position, the first unreeling assembly 110 enters the first material preparation station, and the second tape pressing assembly 260 is aligned with the first suction member 111 in the second direction. At this point, the second tape pressing assembly 260 is able to first press the material tape unreeled by the first unreeling assembly 110 against the first suction member 111 in the second direction. Then, the second cutting assembly 240 can cut the material tape held by the second tape pressing assembly 260 against the first suction member 111. Since the second tape pressing assembly 260 can fix the material tape, the material tape can be more stable when the second cutting assembly 240 performs cutting.

After the cutting of the spare material tape unreeled by the first unreeling assembly 110 is completed, the starting end of the spare material tape can continue to be held against the first suction member 111 by the second tape pressing assembly 260. In this way, before the first unreeling assembly 110 enters the unreeling station for coil replacing, there is no need to start the first suction member 111 to suck and fix the spare material tape. When the first suction member 111 adopts negative pressure suction, air source consumption can be reduced, thus achieving the effect of energy saving.

Accordingly, when the vertical plate 130 passes through the first position, the second unreeling assembly 120 enters the second material preparation station, and the third tape pressing assembly 280 is aligned with the second suction member 121 in the second direction. At this point, the third tape pressing assembly 270 is able to first press the material tape unreeled by the second unreeling assembly 120 against the second suction member 121 in the second direction. Then, the third cutting assembly 250 can cut the material tape held by the third tape pressing assembly 270 against the second suction member 121. Similarly, since the third tape pressing assembly 270 can fix the material tape, the material tape can be more stable when the third cutting assembly 250 performs cutting. After the cutting is finished, the starting end of the spare material tape unreeled by the second unreeling assembly 120 can continue to be held against the second suction member 121 by the third tape pressing assembly 270. Therefore, before the second unreeling assembly 120 enters the unreeling station for coil replacing, there is no need to start the second suction member 121 to suck and fix the spare material tape. When the second suction member 121 adopts negative pressure suction, air source consumption can be reduced, thus achieving the effect of energy saving.

Figure 6:
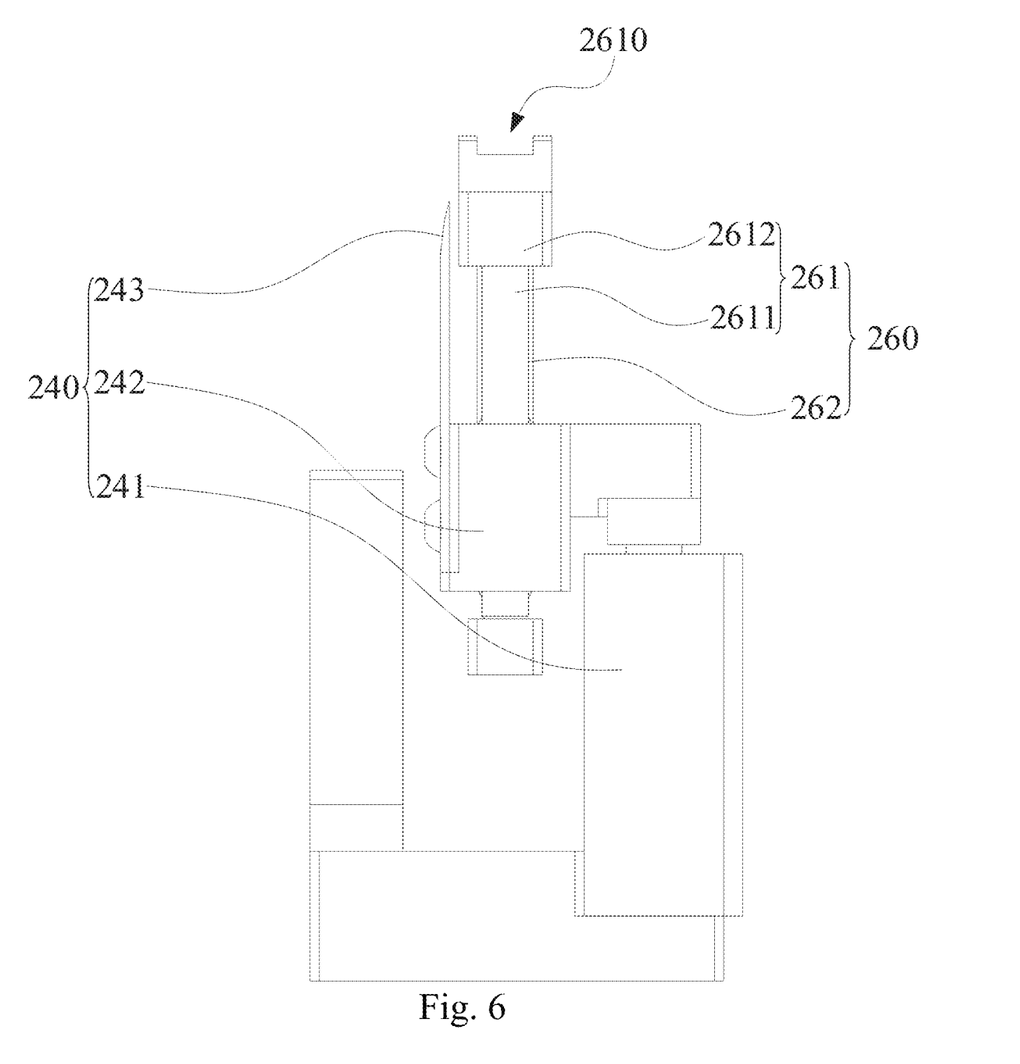
FIG. 6 is a structural diagram of a second cutting assembly and a second tape pressing assembly in the tape connecting mechanism shown in FIG. 3.
Figure 7:
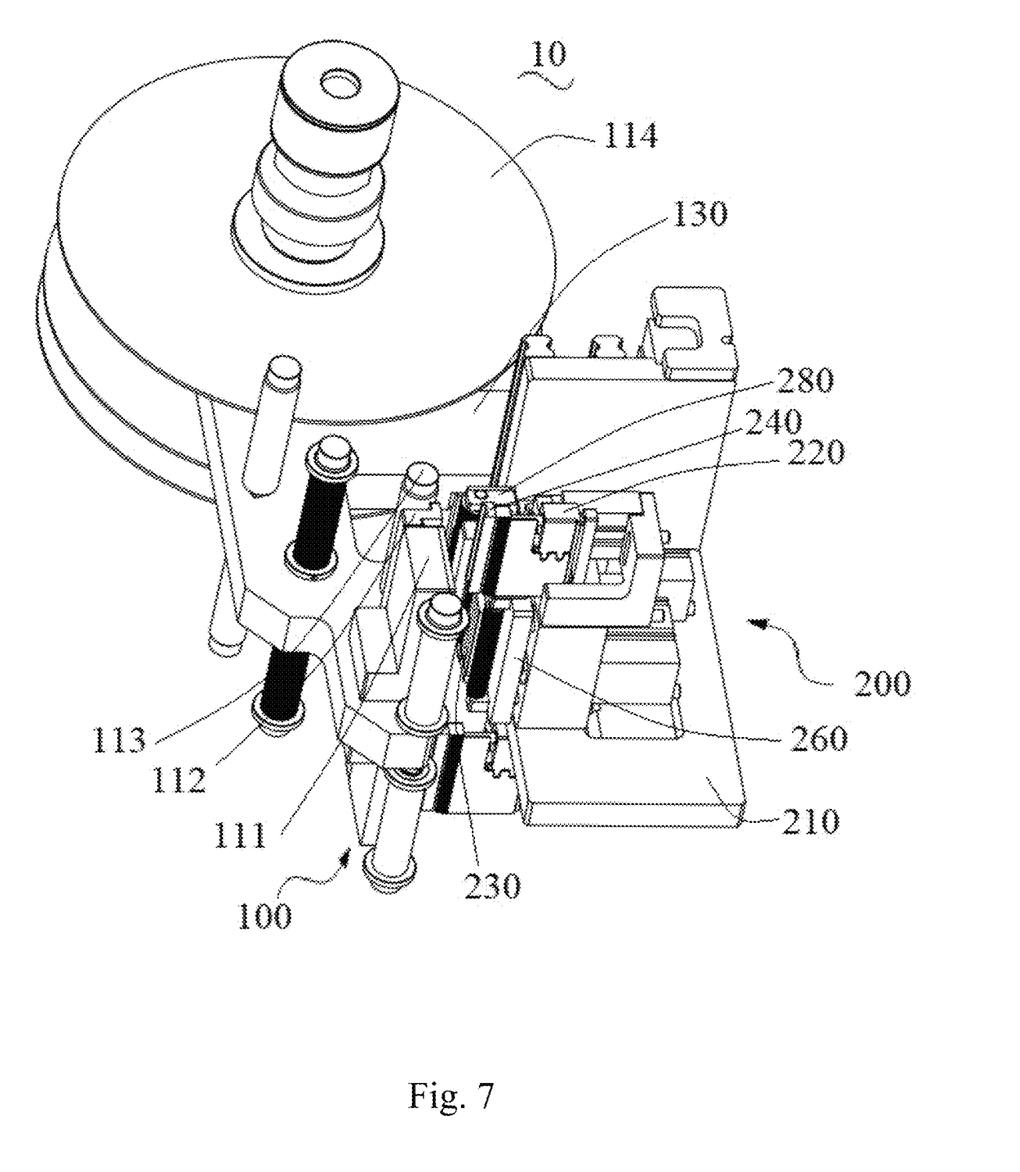
FIG. 7 is a three-dimensional view of the coil replacing device shown in FIG. 1.

Referring to FIG. 6, in this embodiment, the second cutting assembly 240 comprises a second driver 241, a second cutter holder 242, and a second cutter 243. The second cutter 243 is installed on the second cutter holder 242, and the second driver 241 is able to drive the second cutter holder 242 to move in the second direction. The second driver 241 may be an air cylinder, an electric cylinder, etc., and the second cutter 243 can be driven by the second driver 241 to move in the second direction along with the second cutter holder 242, so as to cut the material tape fixed on the first suction member 111.

Further, the second tape pressing assembly 260 comprises a second pressing member 261 and a second elastic member 262, the second pressing member 261 is slidably installed on the second cutter holder 242 in the second direction, and the second elastic member 262 is arranged between the second pressing member 261 and the second cutter holder 242. And in the process that the second driver 241 drives the second cutter holder 242 to approach the first suction member 111 in the second direction, the second pressing member 261 abuts against the material tape sucked by the first suction member 111 before the second cutter 243, and with the second elastic member 262 being compressed and deformed, the second cutter 243 stretches out relative to the second pressing member 261 until the material tape is cut off.

At the initial state, supported by the second elastic member 262, at least part of a side, facing the first suction member 111, of the second pressing member 261 protrudes from the second cutter 243. Therefore, in the process that the second cutter holder 242 drives the second cutter 243 and the second pressing member 261 to move upward together, the second pressing member 261 can abut against the material tape before the second cutter 243, thereby pressing the material tape on a surface of the first suction member 111. Then, as the second driver 241 continues to drive the second cutter holder 242 upward, the second elastic member 262 will be compressed and deformed, and the second cutter 243 will gradually stretch out upwardly relative to the second pressing member 261 until the material tape pressed by the first suction member 111 is cut off.

It can be seen that the second cutting assembly 240 and the second tape pressing assembly 260 share the second driver 241, and the second driver 241 can simultaneously drive the second cutter 243 and the second pressing member 261 to reciprocate in the second direction, so that the number of drivers can be reduced, which is beneficial to further simplifying the structure and reducing the volume of the coil replacing device 10.

It should be noted that the structures of the third cutting assembly 250 and the third tape pressing assembly 270 are the same as those of the second cutting assembly 240 and the second tape pressing assembly 260, and the structure of the first cutting assembly 220 can also be the same as that of the second cutting assembly 240 and the second tape pressing assembly 260, which will not be repeated here.

The second elastic member 262 may be a spring, an elastic pad or an elastic sheet. In this embodiment, the second pressing member 261 comprises a pressing rod 2611 and a pressing head 2612. The pressing rod 2611 extends in the second direction and slidably penetrates through the second cutter holder 242, the pressing head 2612 is fixedly arranged at an end, away from the second cutter holder 242, of the pressing rod 2611. The second elastic member 262 may be a compression spring, the compression spring is disposed around the pressing rod 2611, and two ends of the compression spring abut against the pressing head 2612 and the second cutter holder 242 respectively.

In this embodiment, a groove 2610 is formed in a side, facing the first suction member 111, of the second pressing member 261, and an edge of the groove 2610 is covered with an anti-sticking layer (not shown). Since the sticky surface of the material tape on the first suction member 111 faces downward, the second pressing member 261 will adhere to the material tape when abutting against the material tape. The groove 2610 can reduce the contact area between the second pressing member 261 and the material tape when the second pressing member 261 abuts against the material tape, and the anti-sticking layer can reduce the viscosity of the contact part between the second pressing member 261 and the material tape, thus alleviating the adhesion between the second pressing member 261 and the material tape.

Referring to FIGS. 1 and 2 again, in this embodiment, the first unreeling assembly 110 comprises a first pressing seat 112, the first pressing seat 112 is arranged on the vertical plate 130 and located upstream of the first suction member 111, and the first cutting assembly 220 cooperates with the first pressing seat 112 to cut off the working material tape unreeled by the first unreeling assembly 110.

The first pressing seat 112 may be a metal block structure. When the first unreeling assembly 110 enters the unreeling station, the first pressing seat 112 and the first cutting assembly 220 are opposite to each other in the second direction. At this point, the cutter of the first cutting assembly 220 stretches out in the second direction, so that the material tape unreeled by the first unreeling assembly 110 can be held against the first pressing seat 112 and cut off.

Further, the second unreeling assembly 120 comprises a second pressing seat 122 which is arranged on the vertical plate 130 and located upstream of the second suction member 121, and the first cutting assembly 220 cooperates with the second pressing seat 122 to cut the working material tape unreeled by the second unreeling assembly 120. The second pressing seat 122 generally has the same structure as the first pressing seat 112. When the second unreeling assembly 120 enters the unreeling station, the second pressing seat 122 is opposite to the first cutting assembly 220 in the second direction. At this point, the cutter of the first cutting assembly 220 extends in the second direction, so that the material tape unreeled by the second unreeling assembly 120 can be held against the first pressing seat 112 and cut off.

In this embodiment, the tape connecting mechanism 200 further comprises a clamping assembly 280 located upstream of the first cutting assembly 220, the working material tape unreeled by the unreeling mechanism 100 passes through the clamping assembly 280 before passing through the first cutting assembly 220 and the fixing assembly 230, and the clamping assembly 280 is able to clamp the working material tape passing by.

When the first unreeling assembly 110 or the second unreeling assembly 120 finishes unreeling, the clamping assembly 280 can immediately clamp the working material tape, thereby maintaining the tension of the working material tape. In this way, the first cutting assembly 220 can easily cut off the working material tape, and burrs can be avoided at the edge of the cut end.

In this embodiment, the first unreeling assembly 110 further comprises a first passing roller 113, the first passing roller 113 is arranged on the vertical plate 130 and located upstream of the first suction member 111, and the material tape unreeled by the first unreeling assembly 110 passes around the first passing roller 113. Referring to FIG. 4, the clamping assembly 280 comprises an idler 281 and a third driver 282; and when the first unreeling assembly 110 is located at the unreeling station, the idler 281 and the first passing roller 113 are oppositely arranged in the second direction, and the third driver 282 drives the idler 281 to move in the second direction until the idler 281 abuts against the first passing roller 113 to clamp the working material tape.

Further, the second unreeling assembly 120 further comprises a second passing roller 123, the second passing roller 123 is arranged on the vertical plate 130 and located upstream of the second suction member 121, and the material tape unreeled by the second unreeling assembly 120 passes around the second passing roller 123; and when the second unreeling assembly 120 is located at the unreeling station, the idler 281 and the second passing roller 123 are oppositely arranged in the second direction, and the third driver 282 drives the idler 281 to move in the second direction until the idler 281 abuts against the second passing roller 123 to clamp the working material tape.

The clamping assembly 280 clamps the working material tape through the cooperation of the idler 281 with the first passing roller 113 or the second passing roller 123, which can simplify the structure of the clamping assembly 280.

Figure 5:
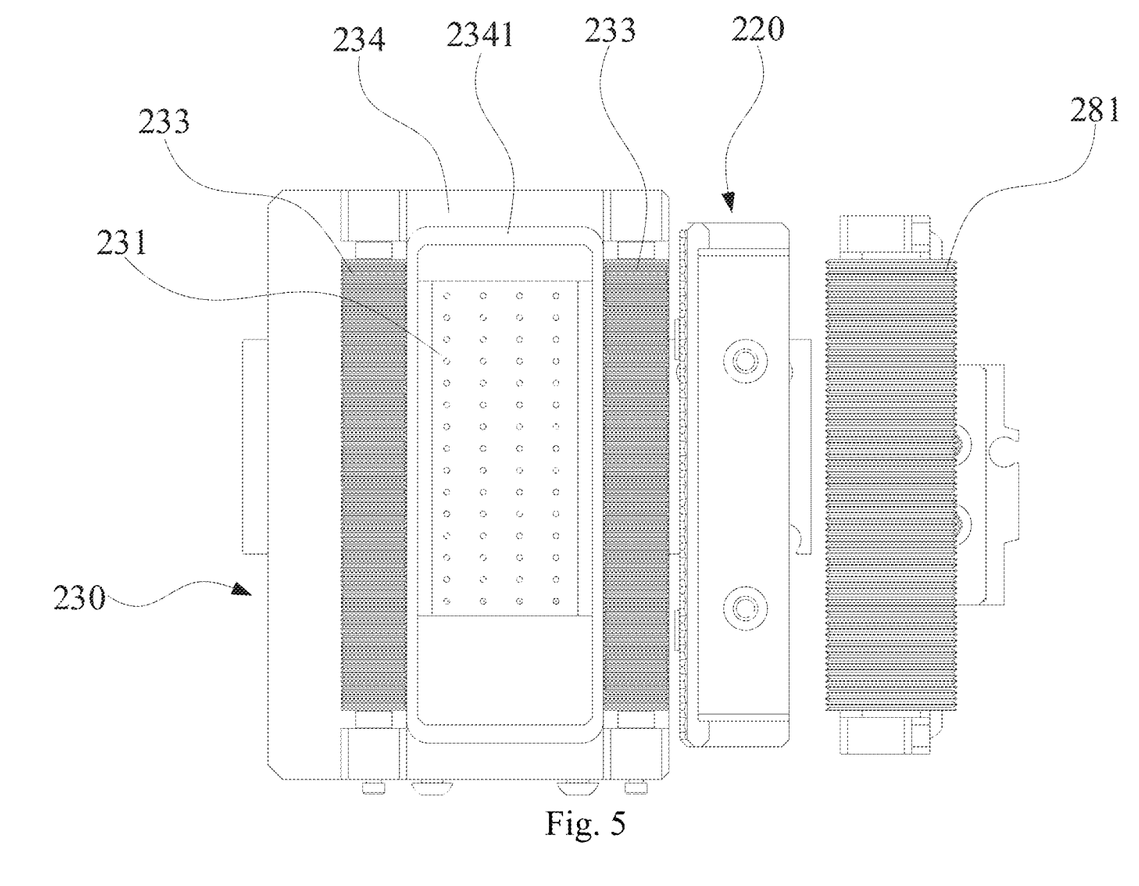
FIG. 5 is a top view of a partial structure of the tape connecting mechanism shown in FIG. 4.

Referring to FIG. 5, in this embodiment, the fixing assembly 230 further comprises flattening rollers 233 located upstream and downstream of the fixing suction member 231, and the flattening rollers 233 are able to move in the second direction together with the fixing suction member 231, hold the material tape against the first suction member 111 or the second suction member 121 located at the unreeling station.

There are at least two flattening rollers 233, which are located upstream and downstream of the fixing suction member 231 respectively. The flattening roller 233 can reciprocate in the second direction under the driving of a separate driver, or can reciprocate in the second direction together with the fixing suction member 231 under the driving of the first driver 232. When the first driver 232 drives the fixing suction member 231 to move up in the second direction and cooperate with the first suction member 111 or the second suction member 121 to clamp the working material tape, the flattening roller 233 can effectively flatten the working material tape and avoid wrinkles.

When the first driver 232 drives the fixing suction member 231 to move up in the second direction, so that the sucked working material tape can be bonded with the spare material tape sucked by the first suction member 111 or the second suction member 121, the flattening roller 233 can also prevent the overlap area between the working material tape and the spare material tape from curling.

Furthermore, in this embodiment, the fixing assembly 230 comprises a roller seat 234 and a fourth driver 245, the flattening rollers 233 are installed on the roller seat 234, the roller seat 234 is installed at a moving end of the fourth driver 245, and the fourth driver 245 is able to drive the roller seat 234 to move in the second direction to make the flattening rollers 233 abut against or leave the first suction member 111 or the second suction member 121 at the unreeling station; and a middle of the roller seat 234 is provided with a through hole 2341, and the fixing suction member 231 can pass through the through hole 2341 under the driving of the first driver 232.

That is, the flattening roller 233 and the fixing suction member 231 can move independently in the second direction. After the working material tape and the spare material tape are bonded, the fixing suction member 231 can be separated from the first suction member 111 or the second suction member 121 under the driving of the first driver 232, while the flattening roller 233 keeps abutting against the material tape. After the fixing suction member 231 restores, the fourth driver 245 drives the flattening roller 233 downward to leave the first suction member 111 or the second suction member 121. In this way, the flattening roller 233 can effectively prevent the working material tape from adhering to the fixing suction member 231 after coil replacing.

According to the coil replacing device 10, when the first unreeling assembly 110 at the unreeling station finishes unreeling, the fixing suction member 231 can be driven by the first driver 232 to abut against the first suction member 111 to clamp the working material tape, the first cutting assembly 220 cuts off the working material tape, and the cut working material tape is sucked by the fixing suction member 231. Then, the vertical plate 130 slides in the first direction until the second unreeling assembly 120 enters the unreeling station, the material tape sucked by the second suction member 121 will also enter the unreeling station as a spare material tape, and the first unreeling assembly 110 will be removed from the unreeling station. The fixing suction member 231 is driven by the first driver 232 to abut against the second suction member 121, so that a cut end of the working material tape can be attached to and bonded with a starting end of the spare material tape, so as to realize coil replacing, and the first unreeling assembly 110 can be loaded with a new material tape to serve as a spare material tape. In the coil replacing process, the vertical plate 130 can slide back and forth in the first direction, and the moving process and transmission structure are simple. The coil replacing device 10 has a simple structure and occupies a small space.

The technical features of the above embodiments can be combined freely. In order to make the description concise, all possible combinations of the technical features in the above embodiments are not described. However, as long as there is no contradiction in the combinations of these technical features, they should be considered as falling in the scope recorded in this specification.

The above embodiments only several implementation ways of the application, and their descriptions are specific and detailed, but they cannot be understood as limiting the scope of the patent of the utility model. It should be pointed out that, for those of ordinary skill in the art, without departing from the concept of the application, several modifications and improvements can be made, which belong to the protection scope of the application. Therefore, the scope of protection of the patent of the application shall be subject to the appended claims.

What is claimed is:

1. A coil replacing device, comprising:
an unreeling mechanism, comprising a vertical plate, and a first unreeling assembly and a second unreeling assembly arranged on the vertical plate in a spaced manner in a first direction, the first unreeling assembly comprising a first suction member, the second unreeling assembly comprising a second suction member, and the first suction member and the second suction member capable of sucking material tapes unreeled by the first unreeling assembly and the second unreeling assembly respectively; and
a tape connecting mechanism, comprising a mounting plate, and a first cutting assembly and a fixing assembly arranged on the mounting plate, the vertical plate slidably arranged at an end of the mounting plate in the first direction to make the first unreeling assembly and the second unreeling assembly alternately enter an unreeling station, and the material tape unreeled by the first unreeling assembly or the second unreeling assembly at the unreeling station being used as a working material tape and sequentially passing through the first cutting assembly and the fixing assembly;
wherein the fixing assembly comprises a fixing suction member and a first driver, the fixing suction member is arranged opposite to the first suction member or the second suction member located at the unreeling station in a second direction perpendicular to the first direction, the first driver is capable of driving the fixing suction member to move in the second direction to make the fixing suction member abut against or leave the first suction member or the second suction member located at the unreeling station, and the first cutting assembly is configured to cut the working material tape clamped between the fixing suction member and the first suction member or the second suction member;
wherein a first material preparation station and a second material preparation station are provided on both sides of the unreeling station in the first direction respectively, and the vertical plate passes through a first position and a second position when sliding in the first direction; when the vertical plate passes through the first position, the first unreeling assembly enters the unreeling station and the second unreeling assembly enters the second material preparation station; and when the vertical plate passes through the second position, the second unreeling assembly enters the unreeling station, and the first unreeling assembly enters the first material preparation station;
wherein the tape connecting mechanism further comprises a second tape pressing assembly arranged on the mounting plate, the second tape pressing assembly is located at the first material preparation station, the second tape pressing assembly is capable of pressing the material tape unreeled by the first unreeling assembly against the first suction member in the second direction, and the second tape pressing assembly comprises a second pressing member;
wherein, a groove is formed in a side, facing the first suction member, of the second pressing member, and an edge of the groove is covered with an anti-sticking layer.

2. The coil replacing device of claim 1, wherein the tape connecting mechanism further comprises a second cutting assembly and a third cutting assembly arranged on the mounting plate, the second cutting assembly and the third cutting assembly are located at the first material preparation station and the second material preparation station respectively, the second cutting assembly is for cutting off a starting end of the material tape sucked by the first suction member, and the third cutting assembly is for cutting off a starting end of the material tape sucked by the second suction member.

3. The coil replacing device of claim 2, wherein the tape connecting mechanism further comprises a third tape pressing assembly arranged on the mounting plate, the third tape pressing assembly is located at the second material preparation station the third tape pressing assembly is capable of pressing the material tape unreeled by the second unreeling assembly against the second suction member in the second direction, and the second cutting assembly and the third cutting assembly are capable of cutting off the material tapes pressed by the second tape pressing assembly and the third tape pressing assembly, respectively.

4. The coil replacing device of claim 3, wherein the second cutting assembly comprises a second driver, a second cutter holder and a second cutter, the second cutter is installed on the second cutter holder, and the second driver is capable of driving the second cutter holder to move in the second direction; the second tape pressing assembly further comprises a second elastic member, the second pressing member is slidably installed on the second cutter holder in the second direction, and the second elastic member is arranged between the second pressing member and the second cutter holder; and when the second driver drives the second cutter holder to approach the first suction member in the second direction, the second pressing member abuts against the material tape sucked by the first suction member before the second cutter, and with the second elastic member compressed and deformed, the second cutter stretches out relative to the second pressing member until the material tape is cut off.

5. The coil replacing device of claim 4, wherein the second pressing member comprises a pressing rod and a pressing head, the pressing rod extends in the second direction and slidably penetrates through the second cutter holder, the pressing head is fixedly arranged at an end, away from the second cutter holder, of the pressing rod, the second elastic member is a compression spring, the compression spring is disposed around the pressing rod, and two ends of the compression spring abut against the pressing head and the second cutter holder respectively.

6. The coil replacing device of claim 1, wherein the vertical plate is L-shaped, an end of the vertical plate is slidably connected to the mounting plate, and another end of the vertical plate extends above the mounting plate to make the unreeling mechanism and the tape connecting mechanism overlap in part in a vertical direction.

7. The coil replacing device of claim 6, wherein an end of the mounting plate is provided with a guide rail extending in the first direction, a side, facing the mounting plate, of the vertical plate is provided with a slider, and the guide rail cooperates with the slider to make the vertical plate and the mounting plate slidably connected with each other.

8. The coil replacing device of claim 7, wherein the coil replacing device further comprises a driving mechanism, and a driving end of the driving mechanism is connected to the vertical plate in a driving mode to drive the vertical plate to slide along the guide rail.

9. The coil replacing device of claim 1, wherein the first suction member and the second suction member are suction discs or suction plates.

10. The coil replacing device of claim 1, wherein the first unreeling assembly further comprises a first unreeling detector capable of generating a trigger command after detecting that the unreeling of the working material tape of the first unreeling assembly is completed.

11. The coil replacing device of claim 10, wherein the first unreeling detector comprises a detection roller and a photoelectric sensor, the working material tape unreeled by the first unreeling assembly passes around and supports the detection roller, the detection roller falls under influence of gravity when the detection roller loses the support of the working material tape, and the photoelectric sensor is for monitoring a movement state of the detection roller.

12. The coil replacing device of claim 1, wherein the second unreeling assembly further comprises a second unreeling detector capable of generating a trigger command after detecting that the unreeling of the working material tape of the second unreeling assembly is completed.

13. The coil replacing device of claim 1, wherein the first unreeling assembly comprises a first pressing seat arranged on the vertical plate and located upstream of the first suction member, and the first cutting assembly cooperates with the first pressing seat to cut off the working material tape unreeled by the first unreeling assembly; and the second unreeling assembly comprises a second pressing seat arranged on the vertical plate and located upstream of the second suction member, and the first cutting assembly cooperates with the second pressing seat to cut off the working material tape unreeled by the second unreeling assembly.

14. The coil replacing device of claim 1, wherein the tape connecting mechanism further comprises a clamping assembly located upstream of the first cutting assembly, the working material tape unreeled by the unreeling mechanism passes through the clamping assembly before passing through the first cutting assembly and the fixing assembly, and the clamping assembly is configured to clamp the working material tape passing by.

15. The coil replacing device of claim 14, wherein the first unreeling assembly further comprises a first passing roller arranged on the vertical plate and located upstream of the first suction member, and the material tape unreeled by the first unreeling assembly passes around the first passing roller; the clamping assembly comprises an idler and a third driver;

when the first unreeling assembly is located at the unreeling station, the idler and the first passing roller are oppositely arranged in the second direction, and the third driver is capable of driving the idler to move in the second direction until the idler abuts against the first passing roller to clamp the working material tape;

the second unreeling assembly further comprises a second passing roller arranged on the vertical plate and located upstream of the second suction member, and the material tape unreeled by the second unreeling assembly passes around the second passing roller; and when the second unreeling assembly is located at the unreeling station, the idler and the second passing roller are oppositely arranged in the second direction, and the third driver is configured to drive the idler to move in the second direction until the idler abuts against the second passing roller to clamp the working material tape.

16. The coil replacing device of claim 1, wherein the fixing suction member is a suction disc or a suction plate.

17. The coil replacing device of claim 1, wherein the fixing assembly further comprises flattening rollers located upstream and downstream of the fixing suction member, and the flattening rollers are configured to move in the second direction, and holding the material tape together with the fixing suction member against the first suction member or the second suction member located at the unreeling station.

18. The coil replacing device of claim 17, wherein the fixing assembly comprises a roller seat and a fourth driver, the flattening rollers are installed on the roller seat installed at a moving end of the fourth driver, and the fourth driver is capable of driving the roller seat to move in the second direction to make the flattening rollers abut against or leave the first suction member or the second suction member at the unreeling station; and a middle of the roller seat is provided with a through hole, and the fixing suction member is configured to pass through the through hole under driving of the first driver.

\* \* \* \* \*